United States Patent
Zanardi

(10) Patent No.: US 6,478,053 B2
(45) Date of Patent: Nov. 12, 2002

(54) PRESSURE-PULSATION-DAMPING FLUID SUPPLY CONDUIT

(75) Inventor: Mariofelice Zanardi, Turin (IT)

(73) Assignee: Dayco Fluid Technologies S.p.A. (IT)

( * ) Notice: Subject to any disclaimer, the term of this patent is extended or adjusted under 35 U.S.C. 154(b) by 0 days.

(21) Appl. No.: 09/956,495

(22) Filed: Sep. 19, 2001

(65) Prior Publication Data

US 2002/0069921 A1 Jun. 13, 2002

(30) Foreign Application Priority Data

Sep. 19, 2000 (IT) .......................... TO00A0873

(51) Int. Cl.⁷ .............................. F16L 55/04
(52) U.S. Cl. ..................... 138/30; 138/26; 138/114; 181/255
(58) Field of Search ............... 138/30, 26, 109, 138/112–114; 181/255; 417/540

(56) References Cited

U.S. PATENT DOCUMENTS

| | | | | |
|---|---|---|---|---|
| 4,451,966 A | * | 6/1984 | Lee | 138/114 |
| 4,585,059 A | * | 4/1986 | Lee | 138/113 |
| 4,611,633 A | * | 9/1986 | Buchholz et al. | 138/26 |
| 5,094,271 A | * | 3/1992 | Fritz et al. | 138/26 |
| 5,172,729 A | | 12/1992 | Vantellini | 138/26 |
| 5,201,343 A | * | 4/1993 | Zimmermann et al. | 138/109 |
| 5,539,164 A | * | 7/1996 | van Ruiten | 138/30 |
| 5,728,981 A | * | 3/1998 | van Ruiten | 138/30 |
| 5,907,134 A | * | 5/1999 | Nording et al. | 138/113 |
| 5,941,283 A | * | 8/1999 | Forte | 138/109 |
| 6,062,265 A | * | 5/2000 | Head | 138/111 |
| 6,073,656 A | * | 6/2000 | Chen et al. | 138/26 |
| 6,119,728 A | * | 9/2000 | Seidel-Peschmann et al. | 138/26 |
| 6,155,378 A | * | 12/2000 | Qatu et al. | 138/113 |

FOREIGN PATENT DOCUMENTS

| | | |
|---|---|---|
| FR | 2 566 504 A | 12/1985 |
| WO | WO-91 13790 A | 9/1991 |
| WO | WO-96 18065 A | 6/1996 |

* cited by examiner

*Primary Examiner*—Patrick Brinson
(74) *Attorney, Agent, or Firm*—Akerman Senterfitt

(57) ABSTRACT

A conduit for supplying a fluid and damping pressure pulsations in the fluid, the conduit having an outer pipe and an inner pipe housed inside the outer pipe, and the outer pipe having a small-diameter intermediate portion cooperating in fluidtight manner with the inner pipe; the inner pipe therefore defines with the outer pipe a first annular chamber and a second annular chamber located on opposite sides of the intermediate portion, and has a number of intermediate holes connecting the inner chamber of the inner pipe to the first and second annular chamber.

12 Claims, 2 Drawing Sheets

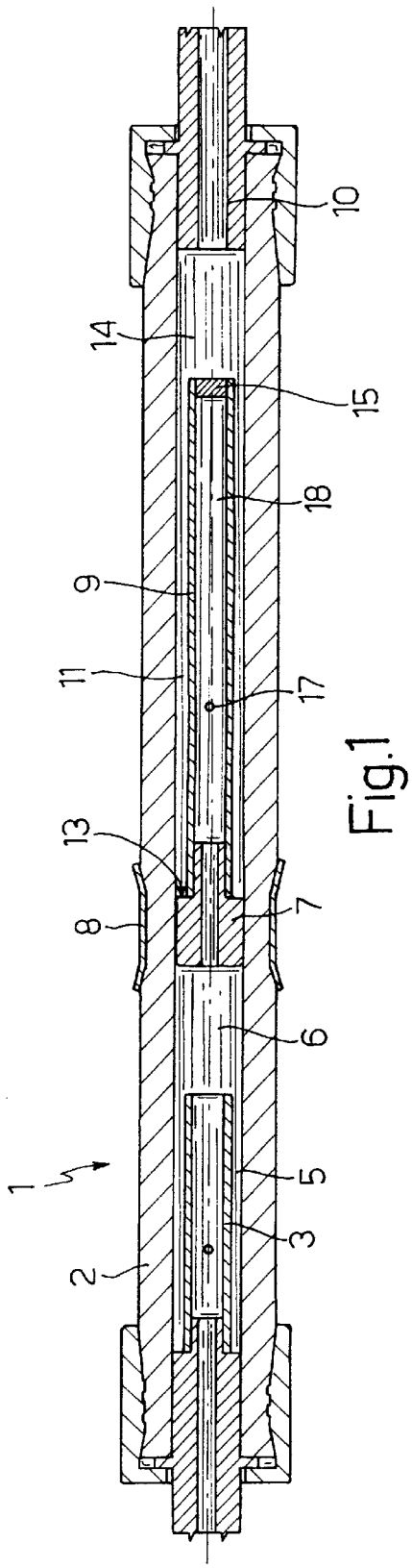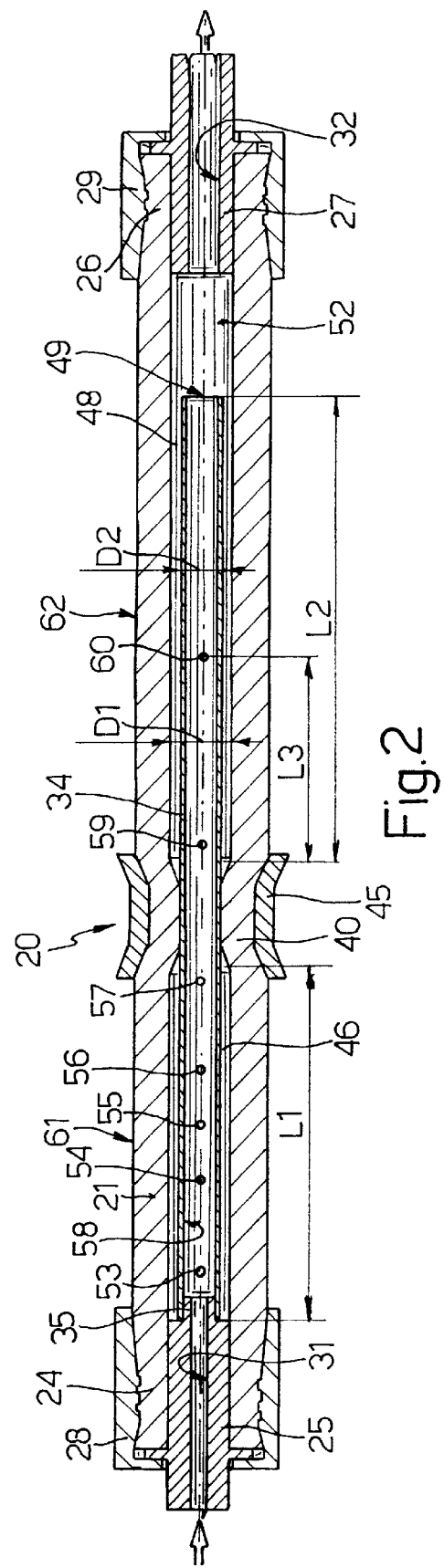

PRESSURE-PULSATION-DAMPING FLUID SUPPLY CONDUIT

The present invention relates to a conduit for supplying a fluid and damping pressure pulsations in the fluid, and particularly, though not exclusively, to a conduit for a vehicle power steering hydraulic circuit.

BACKGROUND OF THE INVENTION

As is known, in hydraulic systems in which the operating fluid is circulated by a pump, the pressure pulsations generated by the pump are transmitted along the conduits and may give rise to undesired noise and vibration.

To reduce such pulsations, conduits are currently used in which the fluid is so routed as to produce reflected pressure waves which interfere with the incident waves; and, by appropriately sizing the lengths traveled by the waves, destructive wave interference, and hence a substantial reduction in pulsation, can be achieved at a given frequency.

In one known embodiment, conduits of the above type are defined by an outer pipe; and an inner pipe, which extends to an appropriately calculated length from an end fitting, and so defines an annular chamber with the outer pipe. The fluid flows along the fitting into the inner pipe and, at the outlet section of the inner pipe, the incoming pressure waves interfere with the waves traveling along the annular chamber and reflected by the end wall of the chamber defined by the fitting. For interference to be destructive, the length of the annular chamber must equal a quarter of the wavelength of the pressure waves.

Conduits of the above type are "tuned" by the above sizing of the inner pipe to a given frequency. In a real circuit, however, the pressure pulsations are periodic but not purely sinusoidal with a specific frequency, and can therefore be divided into a number of frequency components comprising a fundamental or first harmonic and harmonics of frequencies equal to multiples of the fundamental frequency. This therefore poses the problem of attenuating a number of components, typically the first two or three harmonics, which have a much greater amplitude than the higher-order harmonics. This can be done using a conduit comprising a number of elementary conduits of the above type arranged in series and each tuned to a respective frequency. Such a solution, however, is expensive and poses design limitations by imposing a minimum length of the conduit.

Patent EP 796408 describes a more compact solution (FIG. 1) wherein a conduit 1 comprises an outer pipe 2, and a first inner pipe 3 defining, with the outer pipe, an annular chamber 5 which comes out inside an expansion chamber 6 extending between first inner pipe 3 and a fitting 7 fixed inside an intermediate portion of outer pipe 2.

Fitting 7 is clamped inside outer pipe 2 by an outer sleeve 8 crimped onto outer pipe 2, and is fitted with one end of a second inner pipe 9 extending towards an outlet fitting 10 and defining with outer pipe 2 a second annular chamber 11, which is defined axially by fitting 7 and comes out at the opposite end inside a second expansion chamber 14 extending between second inner pipe 9 and outlet fitting 10. Second inner pipe 9 is closed at the free end by a plug 15 axially defining an inner chamber 18 of second inner pipe 9, and has at least one hole 17 connecting inner chamber 18 and second annular chamber 11 and located a predetermined distance from surface 13 of fitting 7 axially delimiting the second annular chamber 11.

Though technically effective, the above solution is relatively complex and expensive to produce by involving a large number of component parts and pipe cutting and assembly operations.

SUMMARY OF THE INVENTION

It is an object of the present invention to provide a fluid supply conduit designed to eliminate the aforementioned drawbacks.

According to the present invention, there is provided a conduit for supplying a fluid and damping pressure pulsations in the fluid, and of the type comprising an outer pipe, two end fittings fixed in fluidtight manner to said outer pipe, and an inner pipe housed inside said outer pipe and forming therewith at least a first annular chamber; characterized in that one of said pipes comprises an intermediate portion deformed radially and cooperating in fluidtight manner, at least in use, with the other of said pipes.

BRIEF DESCRIPTION OF THE DRAWINGS

A preferred, non-limiting embodiment of the present invention will be described by way of example with reference to the accompanying drawings, in which:

FIG. 1 shows an axial section of a first conduit formed in known manner;

FIG. 2 shows an axial section of a first embodiment of a conduit in accordance with the present invention;

DETAILED DESCRIPTION OF THE INVENTION

Figure 3:
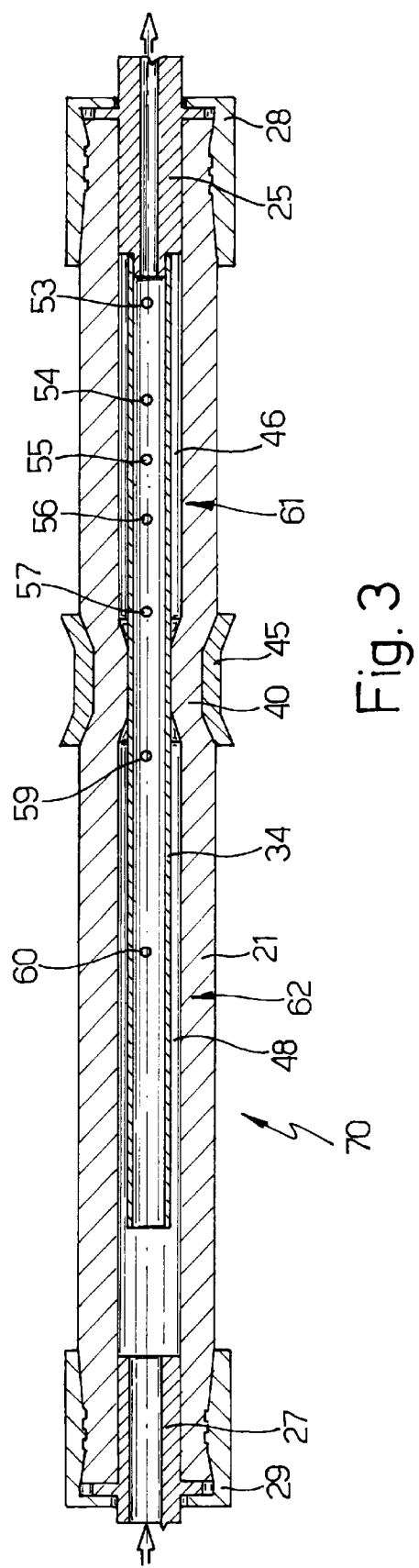
FIG. 3 shows an axial section of a second embodiment of a conduit in accordance with the present invention.

Number 20 in FIG. 2 indicates as a whole a conduit for supplying a high-pressure fluid, in particular for a vehicle power steering hydraulic circuit.

Conduit 20 comprises an outer pipe 21 made of appropriately reinforced elastomeric material, having an inside diameter D1, and comprising an end portion 24 fitted to an inlet fitting 25, and an opposite end portion 26 fitted to an outlet fitting 27. Portions 24, 26 are clamped onto respective fittings 25, 27 by respective known outer fastening caps 28, 29 pressed onto portions 24, 26; and fittings 25, 27 have respective axial through holes 31, 32 defining an inlet opening and an outlet opening of conduit 20 respectively.

Conduit 20 also comprises an inner pipe 34 having an outside diameter D2 smaller than D1, and which is conveniently made of PTFE and is fixed to a nipple 35 defined by an axial appendix of inlet fitting 25. Inner pipe 34 is clamped inside outer pipe 21 at an intermediate portion 40 of outer pipe 21, which intermediate portion has an inside diameter substantially equal to D2 and cooperates in fluidtight manner with inner pipe 34.

Intermediate portion 40 is conveniently defined by the radial compression exerted by an outer sleeve 45 crimped about outer pipe 21.

Inner pipe 34 defines with outer pipe 21, and on opposite sides of intermediate portion 40, a first annular chamber 46 of length L1 and a second annular chamber 48 of length L2.

First annular chamber 46 is closed and is defined axially at one end by inlet fitting 25 and at the opposite end by intermediate portion 40 of outer pipe 21.

Second annular chamber 48 is defined axially at one end by intermediate portion 40 and is open at a free end 49 of inner pipe 34, which terminates at a distance from outlet fitting 27. Second annular chamber 48 thus comes out inside an expansion chamber 52 extending axially between inner pipe 34 and outlet fitting 27, and defined radially by outer pipe 21.

Inner pipe 34 comprises a first number of pairs of diametrically opposite holes 53, 54, 55, 56, 57 connecting the inner chamber 58 of inner pipe 34 to first annular chamber 46; and a second number of pairs of diametrically opposite holes 59, 60 connecting the inner chamber 58 of inner pipe 34 to second annular chamber 48.

More specifically, holes 53, 54, 55, 56, 57 are arranged in succession between inlet fitting 25 and intermediate portion 40; and the number and section of the holes are selected, in relation to the thickness of inner pipe 34, to define a predetermined impedance seen by the fluid flow between inner chamber 58 and the outer first annular chamber 46. Conveniently, holes 53, 57 are located right next to inlet fitting 25 and intermediate portion 40 respectively, so as to assist deaeration of conduit 20, i.e. the removal of any air bubbles remaining after the circuit is filled.

Holes 59, 60 are located in succession from intermediate portion 40 to expansion chamber 52. Holes 60 are located a predetermined distance L3 from intermediate portion 40; and holes 59 are conveniently located close to intermediate portion 40, again to assist deaeration of the conduit.

Outer pipe 21 and inner pipe 34 as a whole define a first resonance damping device 61 and a second destructive-interference damping device 62.

In actual use, the pressurized operating fluid flows through inlet fitting 25 into inner pipe 34, and the pressure waves travel from inner pipe 34 through holes 53–57 into first annular chamber 46 where the amplitude of the pulsations is damped substantially by absorbing energy in resonance conditions.

The fluid then flows past intermediate portion 40 along inner pipe 34, and from this through holes 59 and 60 into second annular chamber 48. At the outlet of inner pipe 34, the pressure pulsations are damped by destructive interference with the pressure waves traveling along second annular chamber 48 and reflected by intermediate portion 40. In this case, the counter-phase sum is obtained by selecting lengths L2, L3 equal to a quarter of the wavelengths of the respective frequency components to be attenuated.

Finally, the fluid flows from second annular chamber 48 into expansion chamber 52—where the pressure waves are further damped by the elasticity of outer pipe 21—and then into outlet fitting 27.

FIG. 3 shows a further embodiment 70 of a conduit in accordance with the present invention.

Conduit 70 is structurally similar to conduit 20 described above, and substantially differs as regards the assembly, i.e. flow, direction. For the sake of clarity, the parts of conduit 70 identical to parts of conduit 20 already described are indicated using the same reference numbers, regardless of the changed location or function.

In this case, fitting 27 defines the inlet fitting; fitting 25 defines the outlet fitting; and inner pipe 34 is fixed to outlet fitting 25, so that fluid flows first through destructive-interference device 62 and then through resonance device 61.

Tests have shown performance of conduit 70 to be substantially equivalent to that of conduit 20, and even better in certain applications.

Figure 4:
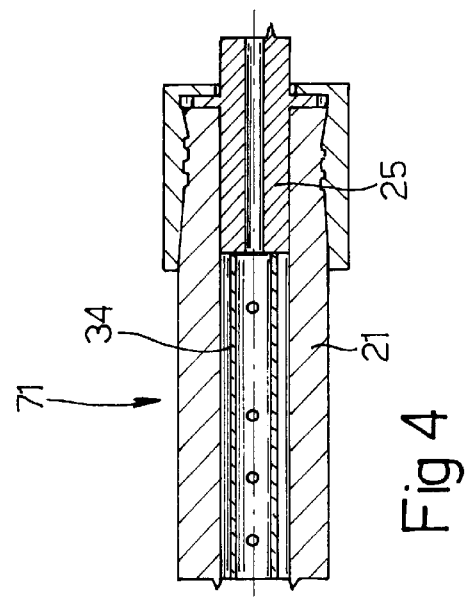
FIG. 4 shows a partial axial section of a third embodiment of a conduit in accordance with the present invention.

FIG. 4 shows part of a variation 71 of conduit 70. In conduit 71—only an outlet portion of which is shown—inner pipe 34 simply rests axially against, as opposed to being fitted to, outlet fitting 25, so that inner pipe 34 is only retained by intermediate portion 40 (not shown) of outer pipe 21. The outside diameter of inner pipe 34 must obviously be greater than the diameter of hole 31 in fitting 25. In this case, inner pipe 34 may be made of material with a lower temperature resistance than PTFE, e.g. an aliphatic or aromatic polyamide, since possible softening at work temperature poses no danger of the pipe working loose from the fitting.

Figure 5:
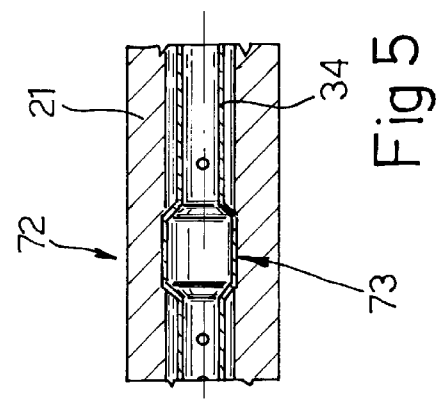
FIG. 5 shows a partial axial section of a fourth embodiment of a conduit in accordance with the present invention.

FIG. 5 shows a fourth embodiment of the present invention, indicated as a whole by 72. Conduit 72 may incorporate the above characteristics of each of conduits 20, 70, 71 described, and differs by inner pipe 34 and outer pipe 21 being sealed at the intermediate portion of the conduit, not by a reduction in the diameter of outer pipe 21, but by a radial projection 73 of inner pipe 34 cooperating with the inner surface of outer pipe 21, which, in this case, is of constant diameter. The projection may be formed, for example, by hot blowing.

The advantages of conduit 20 according to the present invention will be clear from the foregoing description.

In particular, by sealing inner pipe 34 and outer pipe 21 by deforming an intermediate portion of one of the two pipes, it is possible to dispense with an inner fitting and so reduce the number of component parts and cutting and assembly operations with respect to the known technique (FIG. 1) featuring two inner pipes, one of which fitted to an inner fitting.

A conduit in accordance with the present invention provides for reduced load loss as compared with known solutions by eliminating local losses caused by the fluid flowing out of the first inner pipe and into the intermediate fitting, and at the same time provides for accurately calibrating the damping device in relation to the frequency to be attenuated.

Clearly, changes may be made to conduit 20 without, however, departing from the scope of the present invention.

In particular, the conduit may even comprise a number of small-diameter intermediate portions defining a number of damping devices having respective intervention frequencies and combined with one another and/or with other interference, resonance or expansion damping devices. And the devices may comprise one or more intermediate holes at predetermined distances from the respective reflecting surfaces.

Finally, as opposed to initial radial interference between inner pipe 34 and outer pipe 21, intermediate portion 40 and inner pipe 34 may be sealed only in actual use by the pressure of the fluid radially expanding inner pipe 34.

What is claimed is:

1. A conduit for supplying a fluid and damping pressure pulsations in the fluid, comprising:
   an outer pipe;
   end fittings fixed in a fluidtight manner to said outer pipe; and
   an inner pipe housed inside said outer pipe and forming therewith at least a first annular chamber;
   wherein one of said inner and outer pipes comprises an intermediate portion;
   wherein, in use, said intermediate portion is radially deformed so as to contact the other of said pipes in a fluidtight manner.

2. A conduit as claimed in claim 1, wherein said first annular chamber is defined axially at a first end by a first of said fittings.

3. A conduit as claimed in claim 2, wherein said intermediate portion defines a second axial end of said first annular chamber; said inner pipe defining with said outer pipe a second annular chamber located on the opposite side of said intermediate portion with respect to said first annular chamber.

4. A conduit as claimed in claim 3, wherein said inner pipe terminates at a distance from a second of said fittings; said second annular chamber coming out axially inside an expansion chamber extending axially between a free end of said inner pipe and said second fitting and defined radially by said outer pipe.

5. A conduit as claimed in claim 3, wherein said inner pipe comprises at least one hole communicating with said first annular chamber.

6. A conduit as claimed in claim 5, wherein said inner pipe comprises at least one hole communicating with said second annular chamber.

7. A conduit as claimed in claim 1, wherein said inner pipe is made of PTFE.

8. A conduit as claimed in claim 1, wherein said inner pipe is made of a polyamide.

9. A conduit as claimed in claim 1, wherein said intermediate portion is a small-diameter portion of said outer pipe defined by a metal outer sleeve crimped onto said outer pipe.

10. A conduit as claimed in claim 1, wherein said intermediate portion is a radially projecting portion of said inner pipe.

11. A conduit as claimed in claim 1, wherein said first fitting is an inlet fitting of said conduit.

12. A conduit as claimed in claim 1, wherein said first fitting is an outlet fitting of said conduit.

* * * * *